(12) United States Patent
Ishikawa et al.

(10) Patent No.: US 7,046,821 B2
(45) Date of Patent: May 16, 2006

(54) IMAGE DETECTION PROCESSOR

(75) Inventors: Masatoshi Ishikawa, 1571-32 Omuro, Kashiwa-shi, Chiba-ken (JP); Idaku Ishii, Tokyo (JP); Takashi Komuro, Tokyo (JP); Yoshihiro Nakabo, Tokyo (JP); Atsushi Yoshida, Kawasaki (JP)

(73) Assignees: Nippon Precision Circuits, Inc. (JP); Masatoshi Ishikawa (JP)

( * ) Notice: Subject to any disclaimer, the term of this patent is extended or adjusted under 35 U.S.C. 154(b) by 974 days.

(21) Appl. No.: 09/760,331

(22) Filed: Jan. 13, 2001

(65) Prior Publication Data

US 2001/0030690 A1 Oct. 18, 2001

(30) Foreign Application Priority Data

Jan. 14, 2000 (JP) ............................ 2000-010180

(51) Int. Cl.
*G06K 9/00* (2006.01)

(52) U.S. Cl. ............. 382/103; 382/236; 375/240.16; 348/208.16

(58) Field of Classification Search ............. 382/103, 382/153, 232, 107, 239, 132, 123, 236, 174, 382/254, 321; 356/5.01; 396/119; 352/31; 386/130; 250/204; 345/158; 369/44.28; 375/240.16, 375/217; 348/97, 64, 208.16
See application file for complete search history.

(56) References Cited

U.S. PATENT DOCUMENTS 4,186,301 A * 1/1980 Basire et al. ............... 250/204
4,240,727 A * 12/1980 Lermann et al. ............ 396/119
5,150,957 A * 9/1992 Walker et al. .............. 386/130
5,161,140 A * 11/1992 Terada ...................... 369/44.28
5,347,590 A * 9/1994 Nonnweiler et al. ........ 382/132
5,450,146 A * 9/1995 Chedeville et al. ............ 352/31
5,852,491 A * 12/1998 Kato .......................... 356/5.01
5,900,863 A * 5/1999 Numazaki ................... 345/158

* cited by examiner

*Primary Examiner*—Bhavesh M. Mehta
*Assistant Examiner*—Seyed Azarian
(74) *Attorney, Agent, or Firm*—Schulte Roth & Zabel, LLP; Joel E. Lutzker; John C. Garces

(57) ABSTRACT

An image detection processor of the present invention enhances the processing speed of the calculation of the center of gravity or the like of a target with a simple constitution. The image detection processor arranges a plurality of image detection processing elements 1-1 to 1-64 on a plane. Each image detection processing element includes an adder circuit 15 which converts an output of a photoelectric conversion part 5 into digital signals and can receive the digital signals as an input in a matrix form. Cumulative adders are constituted by connecting the adder circuits 15 for respective rows. Series adders 2-1 to 2-8 which are connected in series respectively receive outputs of final stages of cumulative adders of respective rows as inputs and can cumulatively add these outputs. The digital signals are selectively inputted to the cumulative adders using a row decoder 3 and a column decoder 4 and processed data of an image detected by photoelectric conversion parts 5 of a plurality of image detection processing elements are outputted from the series adder 2-8. Due to such a constitution, the processed data necessary for an image processing such as the calculation of the center of gravity can be produced at the time of transferring data thus realizing rapid processing.

13 Claims, 8 Drawing Sheets

| INPUT | OUTPUT | | | | | | | | |
|---|---|---|---|---|---|---|---|---|---|
| | Y | 0 | 1 | 2 | 3 | 4 | 5 | 6 | 7 |
| L L L L | | L | L | L | L | L | L | L | H |
| L L L H | | L | L | L | L | L | L | H | L |
| L L H L | | L | L | L | L | L | H | L | L |
| L L H H | | L | L | L | L | H | L | L | L |
| L H L L | | L | L | L | H | L | L | L | L |
| L H L H | | L | L | H | L | L | L | L | L |
| L H H L | | L | H | L | L | L | L | L | L |
| L H H H | | H | L | L | L | L | L | L | L |
| H L L L | | L | L | L | L | L | L | L | L |
| H L L H | | L | H | L | H | L | H | L | H |
| H L H L | | L | L | H | H | L | L | H | H |
| H L H H | | L | L | L | L | H | H | H | H |
| H H L L | | X | X | X | X | X | X | X | X |
| H H L H | | X | X | X | X | X | X | X | X |
| H H H L | | X | X | X | X | X | X | X | X |
| H H H H | | H | H | H | H | H | H | H | H |

L
H
X (a)            (b)

IMAGE DETECTION PROCESSOR

BACKGROUND OF THE INVENTION

1. Field of the Invention

The present invention relates to an image detection processor used in various control equipment, recognition devices and information inputting devices, and more particularly to an image detection processor for performing image processing of a moving object at a high speed.

2. Related Art Statement

Conventionally, an image processor used in various control equipment, recognition devices and information inputting devices combines a CCD light reception sensor, as used in a video camera or the like, and an external processor to realize functions thereof. Image data obtained by the CCD light reception sensor is transferred to and stored in a separate memory device. Image processing, such as the calculation of the centers of gravity of a target object, is performed through a separate processor.

An image detection processor in a research stage is described in the Journal of Japan Robot Society (Vol. 13, No. 3 (April, 1995), pages 333–338). The device integrally mounts a light reception sensor and a parallel signal processing circuit on one chip. Signal processing such as an edge extraction, a wire size reduction or the like is performed at the sensor side and the result is output in sequence.

However, with respect to a conventional image detection processor, problems persist, such as the signal transfer speed from the CCD light reception sensor is restricted (not less than 1/60 seconds) or the size of the external processor must be substantially increased.

Further, even with respect to the image detection processor in the research stage, although multiple-use image processing becomes possible due to the adoption of architecture employing parallel series processing having a high generality, it has been difficult to arrange a large number of pixels on a limited chip area. Further, there has been another problem that the transfer of image data outputted from the sensor takes time which is greater than the expected time.

SUMMARY OF THE INVENTION

The present invention has been made to overcome these problems and provides an image detection processor in which a plurality of image detection processing elements each of which comprises a photodetector for performing a photoelectric conversion, a converter for converting signals from the photodetector into digital signals and an adder which receives the digital signals as an input are arranged on a plane, wherein the adders of the image detection processing elements are connected with each other in sequence so as to form a cumulative adder, the digital signals of a plurality of image detection processing elements are selectively inputted to the cumulative adder by a control circuit, and processed data is outputted from the cumulative adder based on the image data detected by the photodetector of the image detection processing element. With the image detection processor constructed as described, the processing of data necessary for image processing such as for the calculation of the center of gravity, may be generated at the time of performing the data transmission and a high-speed processing can be realized.

That is, in the image detection processor according to the present invention in which a plurality of image detection processing elements each of which comprises a photodetector for performing a photoelectric conversion, a converter for converting signals from the photodetector into digital signals and an adder which receives the digital signals as an input are arranged on a plane, the image detection processor further includes a cumulative adder which is formed by connecting the adders of a plurality of image detection processing elements in sequence, a control circuit which selectively inputs the digital signals of a plurality of image detection processing elements to the cumulative adder, and an output port to which processed data outputted from the cumulative adder are supplied in response to image data detected by the photodetector.

The image detection processing elements are preferably arranged on a plane in a matrix form. Further, the image detection processor further includes first cumulative adders which connect first adders of a plurality of image detection processing elements in series for respective rows, a second cumulative adder which connects second adders corresponding to each row which receive outputs of final stages of the first cumulative adders of respective rows as inputs, the second cumulative adder cumulatively calculating the outputs of the final stages of the first cumulative adders, a control circuit which selectively inputs the digital signals of a plurality of image detection processing elements into the first cumulative adders, and an output port to which the processed data outputted from the cumulative adders are supplied in response to the image data detected by the photodetector.

Further, it is preferable to design the image detection processor such that all digital signals of the image detection processing elements are inputted to the first cumulative adders by the control circuit and the processed data outputted from the second cumulative adder is set to the 0-order moment of focused images focused to a group of the image detection processing elements.

It is also preferable that several digital signals selected from the digital signals of the image detection processing elements are inputted to the first cumulative adders by the control circuit and the processed data outputted from the second cumulative adder is set to a partial sum for obtaining the N-order (N being an integer of 1 or more) moment of focused images focused to the group of the image detection processing elements.

It is also preferable that the converters are operated in accordance with first clock signals so as to generate the digital signals and the first and second cumulative adders are operated in accordance with second clock signals different from the first clock signals, and the processed data is outputted from the second cumulative adders in order from the lower digit.

It is also preferable that the digital signals outputted from the specific image detection processing element is generated based on the output from the photodetector of the specific image detection processing element and the digital signals from a plurality of image detection processing elements arranged close to the specific image detection processing element.

It is also preferable to form all elements into one chip.

DESCRIPTION OF THE PREFERRED EMBODIMENT

Figure 1:
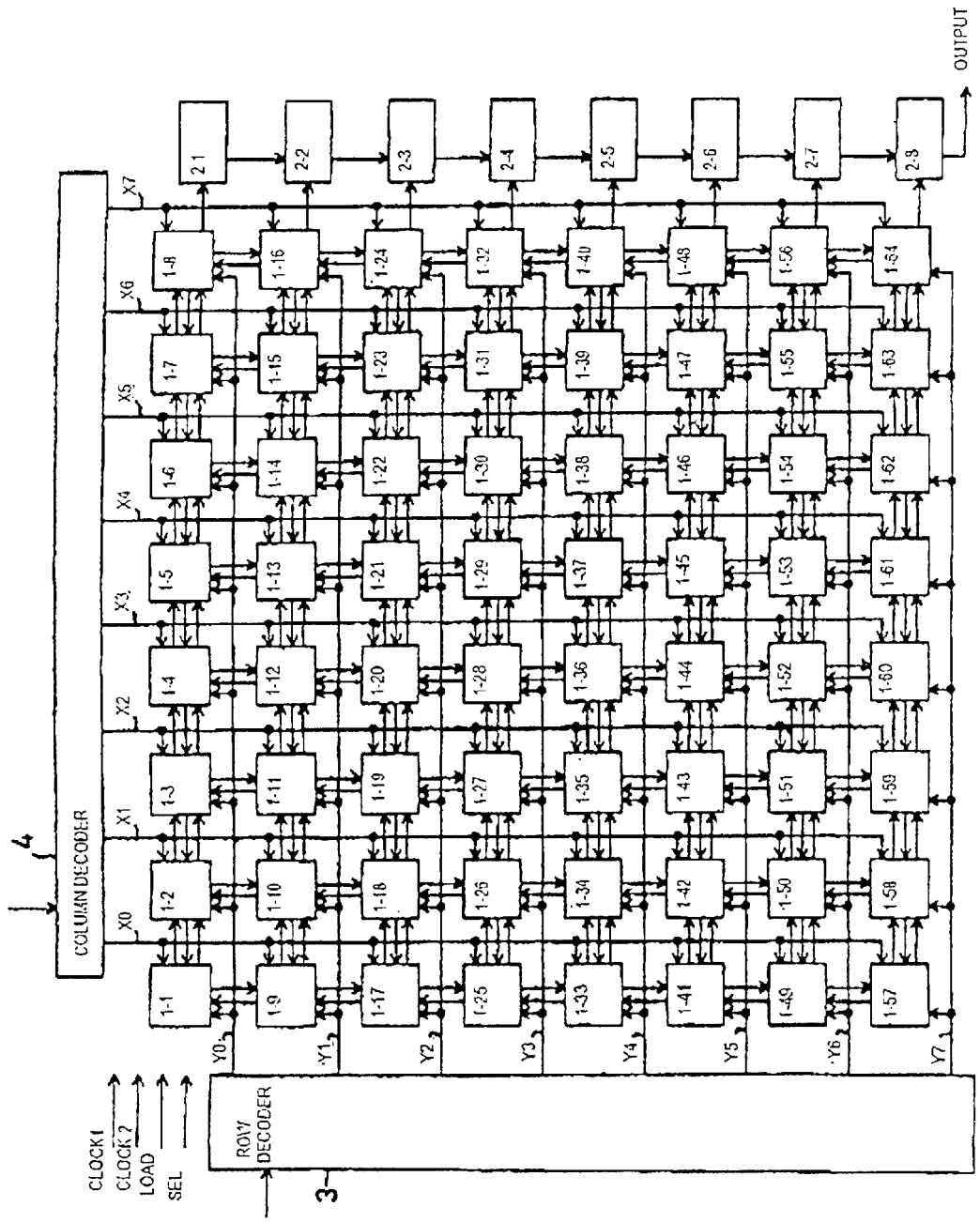
FIG. 1 is a planar view for an image detection processor of the present invention.

Embodiments of the present invention are explained in detail in conjunction with the drawings. FIG. 1 is a planar view of one example of an image detection processor according to the present invention. The image detection processor of this example could be a device which is used for extracting a target image such as a moving body, a projectile, a vehicle or a specific pattern on a semiconductor substrate from a larger image detection area and obtaining positional information, locus information and the like for the target image in the field of a visual sensor for a robot, a collision prevention sensor of an automobile, a semiconductor inspection device and the like. Along with the transfer of the image data, the image detection processor processes data necessary for calculating the O-order moment and first moment, useful for determining the center of gravity of a target image and outputs such data. Since an external processor obtains the positional information, the locus information and the like using the processed data which is preliminarily processed, the processing speed can be enhanced as a whole.

In FIG. 1, numerals 1-1 to 1-64 indicate image detection processing elements which are arranged on a plane as an array structure of 8×8 pieces. As explained below, each image detection processing element includes a photodetector, a conversion part which converts signals transmitted from the photodetector into digital signals and an adder.

Each image detection processing element outputs the digital signals as target image signals to four neighboring image detection processing elements arranged in the up and down directions as well as in the left and right directions. For example, the image detection processing element 1-11 outputs target image signals to the image detection processing elements 1-3, 1-10, 1-12, 1-19. Further, the image detection processing element generates a window image signal for extracting a target from the background in response to the target image signals from four image detection processing elements and a target image signal of the image detection processing element per se. As explained in detail below, an image contained in the window image is set as a new target image and the target is extracted from the background. Further, each image detection processing element includes a first adder, discussed in detail below. The first adder of each image detection processing element is connected to the first adder of the neighboring image detection processing element arranged at its right side. For example, the output of the first adder of the image detection processing element 1-11 is inputted to the first adder of the image detection processing element 1-12. In this manner, the first adders which constitute elements of the image detection processing elements of each row are connected in sequence so as to constitute a first cumulative adder.

As common signals, respective signals CLOCK 1, CLOCK 2, LOAD, SEL are inputted to respective image processing elements. The clock signal CLOCK 1 and the signal LOAD are initial image setting signals. For example, the clock signal CLOCK 1 is a clock signal having a frequency of approximately 20 MHZ–100 MHZ. The clock signal CLOCK 2 and the signal SEL are image operating signals. For example, the clock signal CLOCK 2 is a clock signal having a frequency of approximately 1 MHZ–10 MHZ. The detail of the design of the image detection processing element is shown in FIG. 2 and will be explained later.

In FIG. 1, numerals 2-1 to 2-8 indicate series adders which constitute second adders and are arranged correspondingly to respective rows of the image detection processing elements. Each of series adders 2-1 through 2-8 receive outputs from corresponding image detection processing elements at their respective inputs. Furthermore, the output of each series adder is connected to another input of the sequentially neighboring series adder thus constituting a second cumulative adder circuit. In this embodiment, the series adder 2-1 corresponds to the image detection processing elements 1-1 to 1-8, while the output of the image detection processing element 1-8 is connected to one input of the series adder 2-1. The output of the series adder 2-1 is connected to the other input of the series adder 2-2. The output of the series adder 2-8 becomes an output signal of the whole and hence, the series adder 2-8 constitutes an output port to which processed signals based on the image data detected by the photodetectors are supplied. The constitution of respective series adders is shown in detail in FIG. 3 and is explained below.

Figures 3, 4:
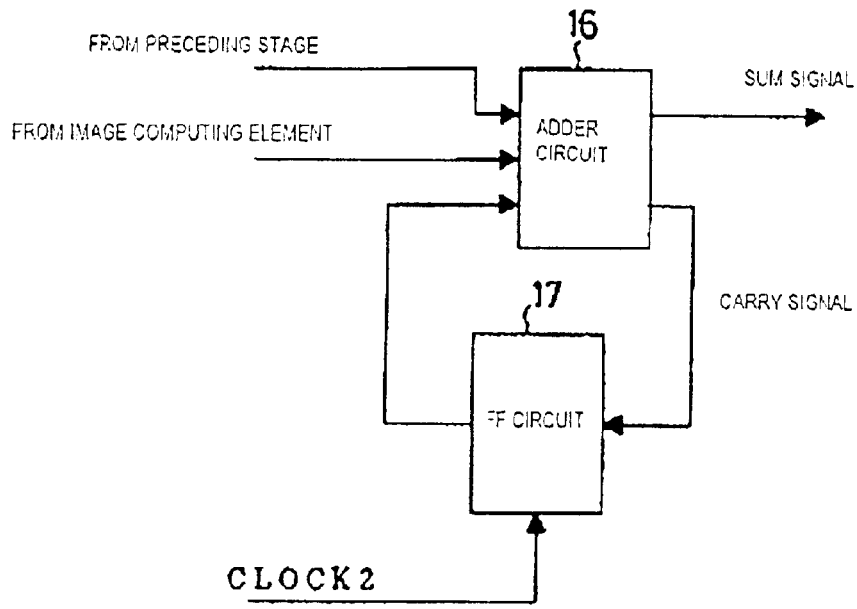
FIG. 3 is a block diagram view of a series adder which constitutes an essential part of the image detection processor of FIG. 1.
FIG. 4 is a chart which explains an operation of a row decoder which constitutes an essential part of the image detection processor of FIG. 1.

In FIG. 1, numeral 3 indicates a row decoder circuit which controls output signals Y0–Y7 using four row selection signals (not shown in the drawing in this example). FIG. 4 shows an example of combinations of the input signals. In FIG. 1, numeral 4 indicates a column decoder circuit which controls output signals X0–X7 using four column selection signals (not shown in the drawing in this example). The setting of selection signals is performed in the same manner as the row decoder 3. Together, the row decoder 3 and the column decoder 4 constitute a control circuit which enables the selective inputting of the target image signals of the image detection processing elements to the first cumulative adder. In this example, the selection of the image detection processing element is performed by downloading the selection pattern from an external host (not shown in the drawing) to the row decoder 3 and the column decoder 4. However, the selection of the image detection element is not limited to such a pattern. For example, a ROM could be integrated into one chip together with the image detection processing element. A selection pattern corresponding to a target image computation could be stored in the ROM and used in the selection of the image detection processing element or a decoder which generates the selection pattern in response to a control signal from the outside could be provided.

Figure 2:
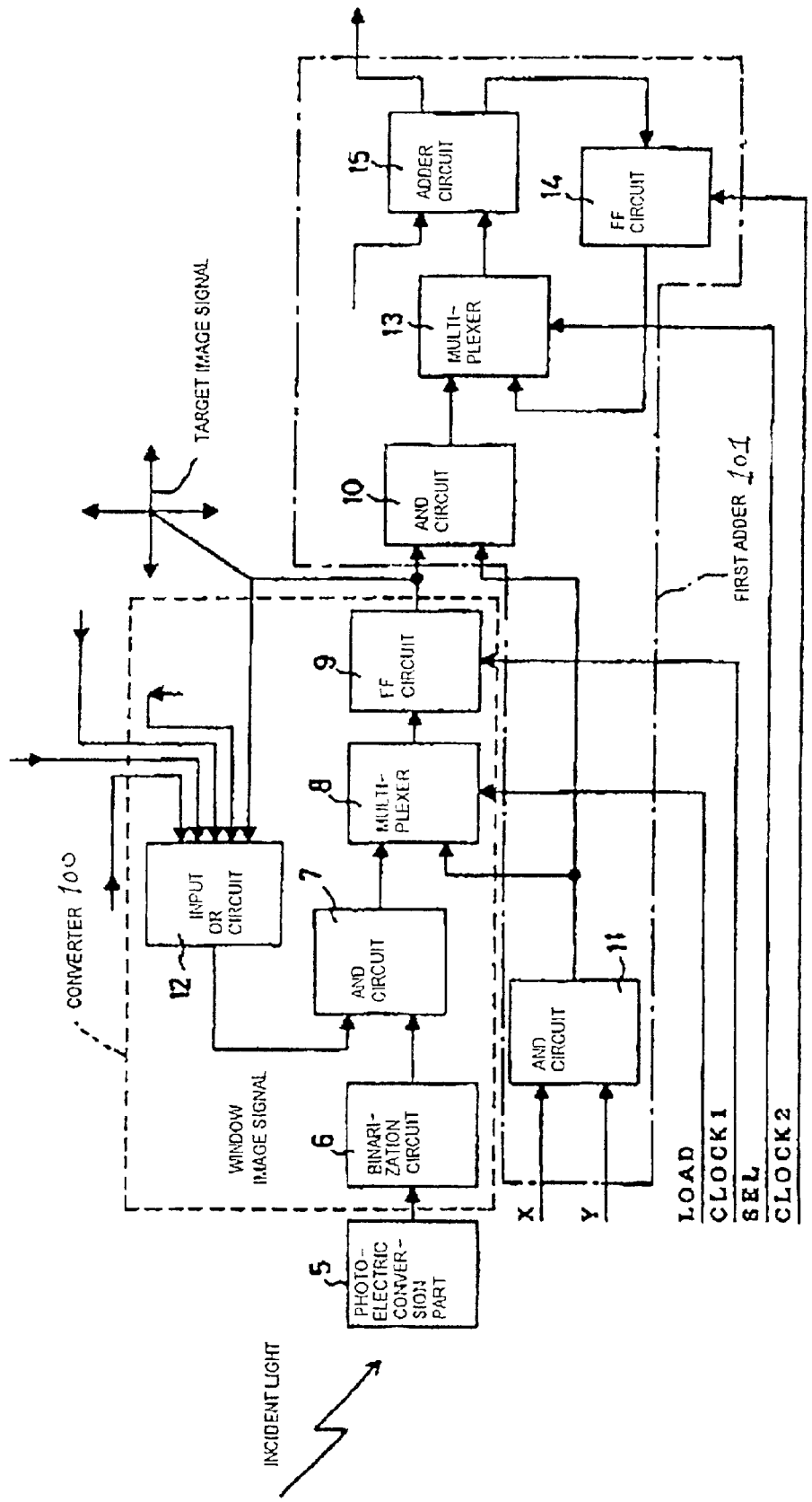
FIG. 2 is a block diagram view of the image detection processing element which constitutes an essential part of the image detection processor of FIG. 1.

FIG. 2 details the design of each image detection processing element. Numeral 5 indicates a photoelectric conversion part which constitutes a photodetector. The photoelectric conversion part 5 is made of a photodiode and outputs a signal corresponding to the intensity of an incident light. Numeral 6 indicates a binarization circuit and is made of a comparator and binarizes signals from the photoelectric conversion part 5. In this example, it is assumed that corresponding to the light quantity inputted to the photoelectric conversion part 5, when the brightness exceeds a given threshold value, an "H" signal is outputted and when the brightness is below the threshold value, an "L" signal is outputted. Although binary data are outputted in this embodiment, the present invention is not limited to this binary data and may adopt an image detection processing element which may process multi-value data having various gradations. In this case, a full adder is used as the first adder.

Numeral 7 indicates a logical multiplication (AND) circuit and outputs an "H" signal when a signal from the binarization circuit 6 and a signal from a five-input logical addition (OR) circuit 12 (discussed in more detail below) are both "H".

Numeral 8 indicates a multiplexer and outputs the signal from the AND circuit 7 when the signal LOAD of FIG. 1 is "H" and outputs the signal from an AND circuit 11 which will be explained later when the signal LOAD of FIG. 1 is "L".

Numeral 9 indicates a flip-flop circuit and takes in the signal of the multiplexer 8 with the clock signal CLOCK 1 of FIG. 1 and outputs the signal. The binarization circuit 6, the AND circuit 7, the multiplexer 8, the flip-flop circuit 9, the five-input logic circuit 12 constitute the converter 100.

Numeral 10 indicates an AND circuit and outputs a "H" signal when an output of the flip-flop circuit 9 and an output of the AND circuit 11 (explained below) are both "H".

Numeral 11 indicates the AND circuit and outputs a "H" signal when an output of the row decoder 3 and an output of the column decoder 4 are both "H". For example, at the image detection processing element 1-11, when an output Y1 of the row decoder 3 and output X2 of the column decoder 4 are both "H", a signal "H" is outputted.

Numeral 12 is the five-input OR circuit and outputs the logical addition based on an output from its own flip-flop circuit 9 and respective flip-flop circuits 9 of neighboring image detection processing elements disposed at the up and down sides as well as at left and right sides. For example, at the image detection processing element 1-11, the outputs of respective flip-flop circuits 9 in the image detection processing elements 1-3, 1-10, 1-12, 1-19 and the output of the flip-flop circuit 9 of the image detection processing element 1-11 per se become the inputs to the circuit and when at least one of these outputs is "H", the output of the circuit becomes "H".

Numeral 13 is a multiplexer and, in this embodiment, outputs a signal from the AND circuit 10 when the signal SEL in FIG. 1 is "H" and outputs a signal from a flip-flop circuit 14 which will be explained hereinafter when the signal SEL in FIG. 1 is Numeral 14 indicates the flip-flop circuit and takes in a CARRY signal of an adder circuit 15 (discussed below) with the clock signal CLOCK 2 of FIG. 1 and outputs the CARRY signal.

Numeral 15 indicates an adder circuit made of a half adder and calculates an arithmetic sum of an output of the multiplexer 13 and a SUM signal of the half adder of the neighboring image detection processing element and outputs the SUM signal and the CARRY signal. For example, at the image detection processing element 1-11, when the output of the multiplexer 13 and the SUM signal of the adder circuit 15 of the image detection processing element 1-10 are both "L", both of the SUM signal and the CARRY signal become "L". When either one of the output of the multiplexer 13 and the SUM signal of the adder circuit 15 of the image detection processing element 1-10 is "L" and the other is "H", the SUM signal becomes "H" and the CARRY signal becomes "L". When the output of the multiplexer 13 and the SUM signal of the adder circuit 15 of the image detection processing element 1-10 are both "H", the SUM signal becomes "L" and the CARRY signal becomes "H". The AND circuits 10, 11, the multiplexer 13 and the flip-flop circuit 14 and the adder circuit 15 constitute the first adder 101.

FIG. 3 details the design of the series adder. Numeral 16 indicates an adder circuit made of a full adder and performs the arithmetic adding computing of the SUM signal of the image detection processing element and SUM signals from a flip-flop circuit 17 (discussed in more detail below) and an adder circuit of the preceding stage and outputs a SUM signal and a CARRY signal. For example, in case of the series adder 2-2, an output of the image detection processing element 1-16, an output of the series adder 2-1 and an output of the flip-flop circuit 17 are inputted to the series adder 2-2 and a SUM signal is outputted to the series adder 2-3 and a CARRY signal is outputted to the flip-flop circuit 17. In the adder circuit 16, when three input states are all "L", both of the SUM signal and the CARRY signal become "L". When any one of three input states is "H", the SUM signal becomes "H" and the CARRY signal becomes "L". When two of three input states are "H", the SUM signal becomes "L" and the CARRY signal becomes "H". When all of three input states are "H", both the SUM signal and the CARRY signal become "H".

Numeral 17 indicates a flip-flop circuit and takes in the CARRY signal of the adder circuit 16 with the clock signal CLOCK 2 and outputs the CARRY signal therefrom.

The manner of operation of the image detection processor is explained hereinafter.

First to initialize an inner circuit, both of the row decoder 3 and the column decoder 4 are set to a non-selective state, such that a pixel selection signal is outputted from the multiplexer 13 with inputting of the signal SEL. In this state, when the clock signal CLOCK 2 is inputted by at least one clock, the flip-flop circuit 14 in each image detection processing element is cleared. Furthermore, when the clock signal CLOCK 2 is inputted by not less than 6 clocks while maintaining this state, the flip-flop circuit 17 in each series adder is cleared in the same manner.

Subsequently, the setting of the window image signals is performed. The window image signals are used for separating the image of the target from the background. A pixel selection signal is outputted from the multiplexer 8 with inputting of the signal LOAD. The initial setting of the window image is performed by setting the row decoder 3 and the column decoder 4. When the row decoder 3 and the column decoder 4 are respectively set such that all outputs can be selected, the initial values of the window image become the whole screen.

Then, the take-in of the image is performed. An image of an object or body is focused on the image detection processing elements which are arranged on a plane using an appropriate focusing optical system. The focusing optical system may be a lens optical system as used in a digital still camera or the like. First, in each image detection processing element, information on contrast of the object or body is converted into an analogue signal corresponding to a light quantity of the focused image. This analogue signal is converted into the binary image signals having the "L" or "H" value by means of the binarization circuit 6.

The binary image signals are converted into the target image signals by performing the logical multiplication computing of the binary image signals and the window image signals at the AND circuit 7. The target image signals are outputted to the flip-flop circuit 9 through the multiplexer 8 and are taken in at the timing of the clock signal CLOCK 1. The target image signals taken in the flip-flop circuit 9 are inputted into the 5 input OR circuit 12 for generating the window signals at the timing of a next clock signal CLOCK 1.

Figure 5:
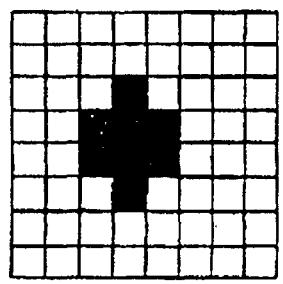
FIG. 5 is an explanatory view for explaining the operation of the image detection processor of FIG. 1.
Figure 5:
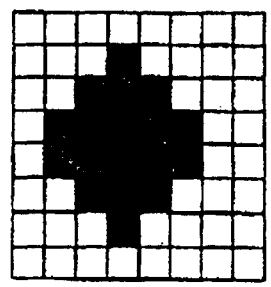

The output of the flip-flop circuit 9 is outputted to the 5 input OR circuit 12 in the same image detection processing element and to the 5 input OR circuits 12 of four neighboring image detection processing element and the window image signals are outputted from the 5 input OR circuits 12. FIG. 5 shows this state. FIG. 5(a) shows a binarized image which becomes an original for generating the window image and respective cells correspond to the image detection processing elements 1-1 to 1-64 shown in FIG. 1. FIG. 5(b) shows the window image generated from FIG. 5(a), wherein the window image is expanded in the up and down directions as well as in the left and right directions relative to the original binarized image by outputting four flip-flop circuits 9 to the 5 input OR circuit 12 in each image element. By performing the logical multiplication computing between the window image (b) and the converted image signal in the next frame, that is, the binarized image (a) in the next frame, the target image is obtained. That is, the window image is formed with a slight expansion following the movement of the target image signals for each frame and the image included in the window image is obtained as a new target image signal at the photoelectric conversion part 5. When the distance between the initial frame and a next frame is sufficiently short, the moving distance of the target is short allowing for the computation of target tracking with a simple circuit of this embodiment.

The image computing operation is explained hereinafter. Note that the total number of pixels which constitute the target image can be regarded as the area (0-order moment) of the target image and the operation to obtain such a 0-order moment is explained. The target image signal outputted from the flip-flop circuit 9 is inputted to the multiplexer 13 only when the pixel selection signal is "H" in the AND circuit 10. Discussed in detail below is the case in which all image computing circuits 1-1 to 1-64 are selected. FIG. 6(a) indicates the state of the target image. Thus, the total number of pixels of "H" is set to 8.

Figure 6:
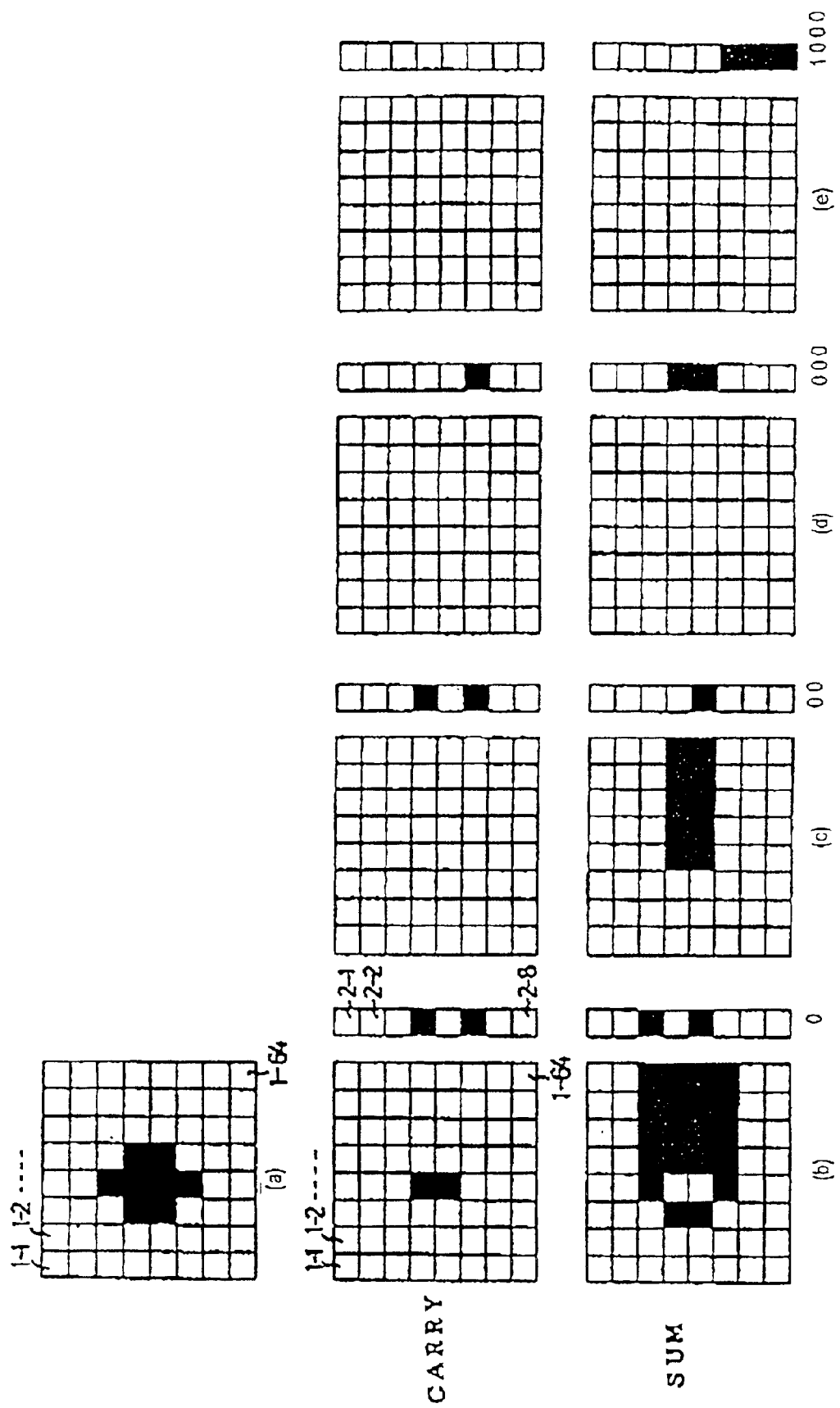
FIG. 6 is an explanatory view for explaining the operation of the image detection processor of FIG. 1.

First, the signal SEL is set to "H" such that the output of the AND circuit 10 is selected by the multiplexer 13. Accordingly, the signal of "H" or "L" corresponding to the target image is inputted to the half adder 15 of each image detection processing element. In FIG. 6, the state of the adders of respective image detection processing elements and the series adder corresponding to the target image FIG. 6(a) are shown in FIG. 6(b). In FIG. 6(b), CARRY and SUM respectively indicate the CARRY signals and the SUM signals of respective adders. The output of the AND circuit 10 which is inputted to the image detection processing element 1-20 is set to "H" and the SUM signal of the adder 15 thereof is sequentially outputted to the image detection processing element 1-21—the image detection processing element 1-24 which constitute the succeeding stage elements and the SUM signal of these adder circuits 15 is set to "H".

At the series adder 2-3 which receives this SUM signal, the SUM signal "H" from the image detection processing element 1-24 and the SUM signal "L" of the adder circuit 16 of the series adder 2-2 of the preceding stage are added so as to set the SUM signal to "H" and the CARRY signal to "L". Further, all of the outputs of the AND circuits 10 of the image detection processing elements 1-27, 1-28, 1-29 are set to "H". At the adder circuit 15 of the image detection processing element 1-28, the output "H" of the AND circuit 10 thereof and the SUM signal "H" of the image detection processing element 1-27 of the preceding stage are added to set the SUM signal to "L" and the CARRY signal to "H". The SUM signal of the adder circuit 15 of the image detection processing element 1-29 is sequentially outputted to the image detection processing element 1-30—the image detection processing element 1-32 which constitute the succeeding stage elements and the SUM signal of these adder circuits 15 is set to "H".

At the series adder 2-4 which receives this SUM signal, the SUM signal "H" from the image detection processing element 1-32 and the SUM signal "H" of the adder circuit 16 of the series adder 2-3 of the preceding stage are added so as to set the SUM signal to "L" and the CARRY signal to "H". Further, all of the outputs of the AND circuits 10 of the image detection processing elements 1-35, 1-36, 1-37 are set to "H". At the adder circuit 15 of the image detection processing element 1-36, the output "H" of the AND circuit 10 thereof and the SUM signal "H" of the image detection processing element 1-35 of the preceding stage are added to set the SUM signal to "L" and the CARRY signal to "H". The SUM signal "H" of the adder circuit 15 of the image detection processing element 1-37 is sequentially outputted to the image detection processing element 1-38—the image detection processing element 1-40 which constitute the succeeding stage elements and the SUM signal of these adder circuits 15 is set to "H".

At the series adder 2-5 which receives this SUM signal, the SUM signal "H" from the image detection processing element 1-40 and the SUM signal "L" of the adder circuit 16 of the series adder 2-4 of the preceding stage are added so as to set the SUM signal to "H" and the CARRY signal to "L". Further, at the adder circuit 15 of the image detection processing element 1-44, the output "H" of the AND circuit 10 thereof and the SUM signal "L" of the image detection processing element 1-43 of the preceding stage are added so as to set the SUM signal to "H" and the CARRY signal to "L".

In the same manner, the SUM signal "H" of the adder circuit 15 of the image detection processing element 1-44 is sequentially outputted to the image detection processing element 1-45—the image detection processing element 1-48 which constitute the succeeding stage elements. At the series adder 2-6 which receives this SUM signal, the SUM signal "H" from the image detection processing element 1-48 and the SUM signal "H" of the adder circuit 16 of the series adder 2-5 of the preceding stage are added so as to set the SUM signal to "L" and the CARRY signal to "H". The SUM signal "L" of the adder circuit 16 of the series adder 2-6 is sequentially outputted to the series adders 2-7, 2-8 of the succeeding stage. Here, from the output of the series adder 2-8, the value of the lowermost digit when the total number of the pixels which constitute the target image is expressed by a binary number is outputted and the signal of "L" level corresponding to 0 is outputted for the target image of FIG. 6(a).

In this state, when the clock signal CLOCK 2 is inputted, the CARRY signal is taken into the flip-flop circuit 14. By setting the signal SEL to "L", the CARRY signal stored in the flip-flop circuit 14 is outputted to the half adder 15 in place of an output of the AND circuit 10. The state of respective image detection processing elements and series adders in this case is shown in FIG. 6(c). As shown in FIG. 6(b), at the image detection processing elements 1-28, 1-36, the CARRY signal stored in the flip-flop circuit 14 is set to "H" and the adder circuits 15 of the image detection processing elements 1-29 to 1-32, 1-37 to 1-40 set the SUM signals to "H" and the CARRY signals to "L".

In the adder circuit 16 of the series adder 2-4, the SUM signal "L" from the series adder of the preceding stage, the SUM signal "H" from the image detection processing element 1-32 and the CARRY signal "H" stored in the flip-flop circuit 17 are added and hence, the SUM signal is set to "L" and the CARRY signal is set to "H". In the adder circuit 16 of the series adder 2-5, the SUM signal "L" from the series adder of the preceding stage, the SUM signal "H" from the image detection processing element 1-40 and the CARRY signal "L" stored in the flip-flop circuit 17 are added and hence, the SUM signal is set to "H" and the CARRY signal is set to "L". In the adder circuit 16 of the series adder 2-6, the SUM signal "H" from the series adder of the preceding stage, the SUM signal "L" from the image detection processing element 1-48 and the CARRY signal "H" stored in the flip-flop circuit 17 are added and hence, the SUM signal is set to "L" and the CARRY signal is set to "H". In the adder circuit 16 of the series adders 2-7 and 2-8, the SUM signal is set to "L" and the CARRY signal is set to "L". Here, the value of the lowermost order +1 digit when the total number of the pixels which constitute the target image is expressed by a binary number is outputted from the output of the series adder 2-8. For the target image of FIG. 6(*a*), a signal of "L" level corresponding to 0 is outputted.

Then, in the same manner as above, each time the clock signal CLOCK 2 is inputted, the state of respective image detection processing elements and the series adders sequentially become as depicted in FIG. 6(*d*) and FIG. 6(*e*). In the state shown in FIG. 6(*e*) where 3 clocks of the clock signal CLOCK 2 are inputted, "H" is outputted from the output of the series adder 2-8 and the value of the lowermost order +3 digits when the total number of the pixels which constitute the target image is expressed by a binary number is outputted from the output of the series adder 2-8. The value which is obtained from the series adder 2-8 after inputting of the SEL signal "H" become "1000" and the binary value corresponding to the total number 8 of pixels which constitute the target image shown in FIG. 6(*a*) is obtained. Thereafter, even when the clock signal CLOCK 2 is inputted, the CARRY signal is not stored in any one of the flip-flop circuits and hence, the "L" is outputted from the output of the series adder 2-8.

As mentioned above, each time the clock signal CLOCK 2 is inputted, the total number of pixels which constitute the target image is sequentially outputted from the lower-order digit. In this embodiment, after inputting the SEL signal, by inputting 7 clocks of the clock signal CLOCK 2, the total number of the pixels which constitute the target image in FIG. 6(*a*) can be obtained with the 7-digit binary value. In this embodiment, with a small number of clocks, the total number of the pixels which constitute the target image, that is, the area (0-order moment) of the target image can be obtained. Conventionally, the state of the pixels is read one by one for each clock and thereafter the area of the target image is obtained. Hence, if the number of pixels is 64, then 64 clocks are necessary. In this embodiment, 7 clocks is sufficient for obtaining the area of the target image.

Figure 7:
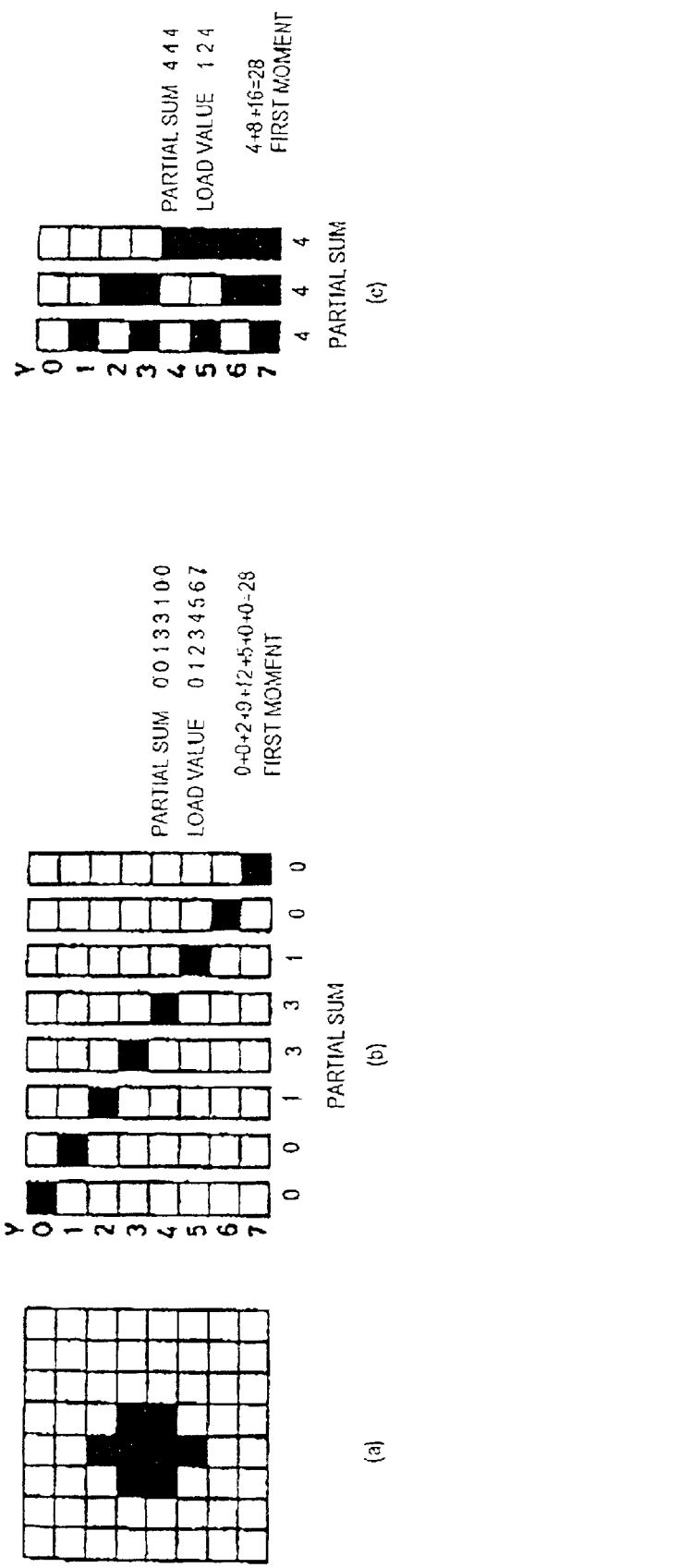
FIG. 7 is an explanatory view for explaining the operation of the image detection processor of FIG. 1.

The manner of operation for obtaining the first moments is explained below. To obtain the first moments, by selecting suitable pixels using the row decoder 3 and the column decoder 4, several kinds of partial sums are obtained and then the sum of these partial sums is calculated outside. FIG. 7 shows this manner of operation. In FIG. 7(*a*) shows an image which constitutes an object. FIG. 7(*b*) and FIG. 7(*c*) each show an example of a selection pattern of the column decoder and the values of partial sums corresponding to the selection pattern. A longitudinal direction of the array of the image detection processing elements is taken on a Y axis, wherein the coordinate positions are set to 0, 1 , . . . 7 from the top and a lateral direction of the array of the image detection processing elements is taken on an X axis, wherein the coordinate positions are set to 0, 1 , . . . 7 from the left to right. The first moments along the X axis and the Y axis are respectively expressed as the sum obtained by multiplying the values of coordinate position as the load value to the sum of moment in the axial direction. For example, to obtain the first moment in the Y axis direction, first the sum of the pixels which constitute the target image is obtained by the above-mentioned method such that only the lowermost column is selected in setting the row decoder 3. Then, 7 is multiplied to the obtained value using an external processor (or a processor integrated with the image detection processor of this embodiment) since the Y coordinates of this column is 7. Subsequently, the sum is obtained such that only the second column from the bottom is selected. As the load value, 6 is multiplied to the obtained value and then the resultant value is added to the previously obtained value. In the same manner, the coefficient of the load value is multiplied in sequence and the partial sums of respective columns are added so as to obtain the first moment.

With respect to the load values, they can be separated such as 7=4+2+1, 6=4+2, 5=4+1, 4=4, 3=2+1, 2=2, 1=1. Accordingly, in setting the row decoder 3, as shown in FIG. 7(*c*), the rows corresponding to the coordinating positions 7, 5, 3, 1 on the Y axis are unitarily designated, the sum of the pixels included in the rows and constituting the target image is obtained, and the load value 1 is multiplied to the sum. Subsequently, the rows corresponding to the coordinate positions 7, 6, 3, 2 on the Y axis are unitarily designated, the sum is obtained and the load value 2 is multiplied to the sum. Then, the rows corresponding to the coordinate positions 7, 6, 5, 4 on the Y axis are unitarily designated, the sum is obtained and the load value 4 is multiplied to the sum. The first moment can be also obtained in the above-mentioned procedure. In this case, since the first moment can be calculated by performing the partial sum calculation three times, the first moment can be obtained with less calculation time.

The first moment in the X axis direction can be also easily calculated in the same manner by controlling the setting of the column decoder 4. Further, with respect to the higher-order moment, the calculation of such a moment can be easily realized by suitably selecting the setting of respective decoders and the coefficients of load values. Further, by dividing the obtained first moment with the area (0-order moment), the coordinates of the center of gravity can be easily obtained.

Figure 8:
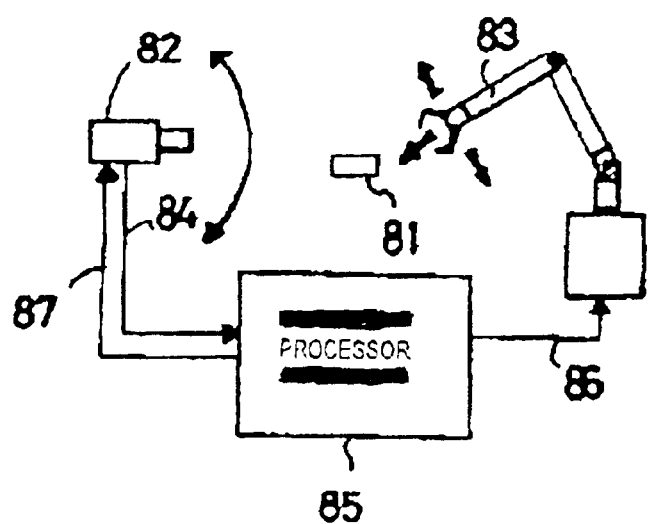
FIG. 8 is an explanatory view for explaining the constitution of a robot using the image detection processor of the present invention.

According to this embodiment, in the image detection processor, the processing data necessary for the image processing such as the calculation of the center of gravity or the like can be generated at the time of transferring data so that the image processing which is performed by the image detection processor and the external processor together can be performed rapidly. Furthermore, since the computational processing can be performed without regard to the distance between frames, the image detection processor is suitable for rapidly performing the processing. Therefore, when an embodiment of the current image detection processor is used as a visual sensor of a robot, a collision prevention sensor of an automobile or the like, it can enhance the processing speed of the whole device. For example, when the image detection processor of this embodiment is incorporated into a visual sensor 82 of an arm robot which grips an object 81 as shown in FIG. 8, the image detection processor takes in both of the object 81 and an arm 83 as an image, outputs the processing data 84 based on the image data to a processor 85 by performing the above-mentioned operations. In the processor 85, the position of the center of gravity, the locus and the like of the object 81 and the arm 83 are obtained by the image processing. Then, the result is fed back to a control 86 of the arm 83 and a target tracking control 87 of the visual sensor 82 thus realizing the rapid processing. Further, rapid control can be realized even with only information from the visual sensor so that the number of necessary various sensors can be reduced and the size of the device can be miniaturized.

Furthermore, it is also easy to simultaneously design a circuit system which outputs a computed result and a circuit which outputs analogue video signals as in the case of a video camera or the like.

Although the binary data (data of two gradation) are used as the image data in this embodiment, the present invention is not limited to binary data and with the use of full adders as the first adders in the image detection processing elements, the present invention is applicable to a case where data of multi-gradation is used as the image data. In this case, although the magnitude of the circuit of each image detection processing element becomes large, there is an advantageous effect that when the image data has the gradation, computing the load values can be performed using the gradation. The points which are to be changed in the design when the full adders are used as the first adders are discussed further below.

Figure 9:
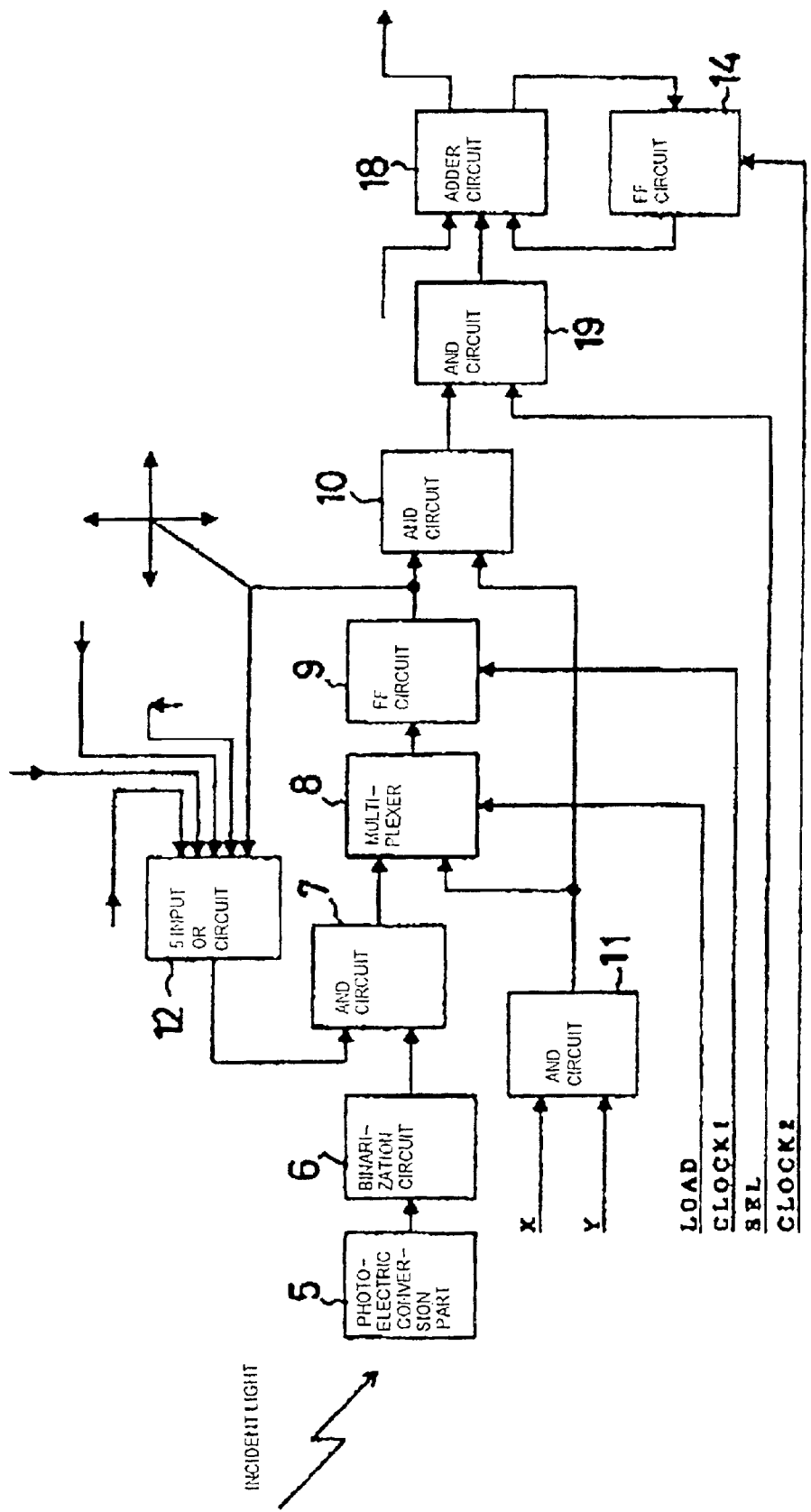
FIG. 9 is an explanatory view for explaining the constitution of the image detection processing element which constitutes an essential part of the image detection processor of FIG. 1.

Additionally, in the case that the full adders are used as the first adders, the computation of a feature quantity can be performed more rapidly when binary data are used as the image data, as realized by the embodiment shown in FIG. 9. In the image detection processing element shown in FIG. 9, an adder circuit 18 made of a full adder is provided in place of the adder circuit 15 (of FIG. 2) and an AND circuit 19 is provided in place of the multiplexer 13 (of FIG. 2). The other design elements are similar to those of the image detection processing embodiment shown in FIG. 2. The adder circuit 18 receives the target image signals in the image detection processing element through the AND circuit 19. The inputting of the target image signal is controlled with the SEL signal in the same manner as mentioned previously. The adder circuit 18 receives an output from the flip-flop circuit 14 and an output from an adder circuit 18 of an image detection processing element of a preceding stage. The operation of the adder circuit 18 is similar to that of the series adder shown in FIG. 3. With such an embodiment, by sequentially selecting the row decoder or the column decoder at the time of calculating the first moment, in case of a design of n×n pixels, the first moment can be calculated by computing with 3n−1 clocks. For example, in case of a design made of 8×8 pixels, the first moment can be selected with 8 clocks.

The mathematics of the moment computation processing of the present invention is discussed hereinafter.

The size of the image is assumed such that the number of image detection processing elements is $N^2$ ($N=2^n$). Gradation of the image data is assumed such that $M=2^m$. The image data of the image detection processing element disposed at the coordinate position x along the X axis and at the coordinate position y along the Y axis is designated as I (x, y). The running time is expressed by the number of clocks (clock signal CLOCK 2 in this embodiment) at the image detection processing element.

The general moment quantity $m_{ij}$ to the image I (x, y) is defined by equation (1) below.

$$m_{ij} = \sum_{x=1}^{N} \sum_{y=1}^{N} x^i y^j I(x, y) \quad (1)$$

The 0-order moment $m_{00}$ is expressed by equation (2) below.

$$m_{00} = \sum_{x=1}^{N} \sum_{y=1}^{N} I(x, y) \quad (2)$$

This is the sum of the image data and the number of clocks necessary for the computing becomes $\log_2$ (maximum value of the output) and $\log_2 (N^2(M-1)) \cong (2n+m)$. In this embodiment, the gradation is 2 and the number of the image detection processing elements is 64 and hence, the number of clocks becomes 7.

The first moment is expressed by equations (3) and (4) below, where $m_{10}$ is the first moment in the row direction and the $m_{01}$ is the first moment in the column direction.

$$m_{10} = \sum_{x=1}^{N} \sum_{y=1}^{N} x I(x, y) \quad (3)$$

$$m_{01} = \sum_{x=1}^{N} \sum_{y=1}^{N} y I(x, y) \quad (4)$$

Since the image detection processing elements of this embodiment are not provided with the multiplication function, the load values (x, y) for respective rows and respective columns are multiplied by an external processor such as processor 85 of FIG. 8 or an integral processor with like function. When the image detection processing elements are provided with this multiplication function, xI(x, y) and yI(x, y) may be calculated within the respective image detection processing elements and the sum of these values may be calculated and hence, the number of clocks necessary for computing becomes $\log_2 (N^2 (N-1) (M-1)/2 \approx (3n+m)$.

Typically, providing a multiplication function to the image detection processing elements is difficult where the size of the circuit is limited. However, due to the function of performing the sum computation by taking the logical multiplication of the selection pattern and the data in the image detection processing element (that is, the function of selecting each image detection processing element) and the expansion of the load values on the bit plane (expansion with the binary number), the calculation speed is maximized when utilizing the disclosed embodiment for a moment quantity of first order or more.

Assume the binary expression of x made by $x_n, x_{n-1} \ldots x_1$, x is expressed by equation (5) below.

$$x = x_n 2^{n-1} + x_{n-1} 2^{n-2} + \ldots + x_1 2^0 \quad (5)$$

-continued $$= \sum_{k=1}^{n} x_k 2^{k-1}$$

The first moment $m_{10}$ is expressed by equation (6) below.

$$m_{10} = \sum_{x=1}^{N} \sum_{y=1}^{N} xI(x, y) \qquad (6)$$

$$= \sum_{x=1}^{N} \sum_{y=1}^{N} \sum_{k=1}^{n} x_k 2^{k-1} I(x, y)$$

$$= \sum_{k=1}^{n} 2^{k-1} \sum_{x=1}^{N} \sum_{y=1}^{N} x_k I(x, y)$$

$$= \sum_{k=1}^{n} 2^{k-1} s_k$$

The value of $s_k$ obtained by taking the logical multiplication of the selection pattern shown in FIG. 7(c) and the data in each image detection processing element, wherein the selection pattern shown in FIG. 7(c) corresponds to k=1, 2, 3 although they differ in the row and the column. The number of clocks necessary for obtaining $s_k$ is $\log_2 (N^2(M-1)/2) \approx (2n+m-1)$. Accordingly, $m_{10}$ is calculated such that $s_k$ is repeated from k=1 to n, and they are added while performing the bit shift using the external processor such as processor 85 of FIG. 8 or an integrated processor of similar function and the number of clocks necessary for obtaining the value $m_{10}$ becomes n (2n+m−1).

Only when the image data uses 2 gradations made of 1, 0 (hereinafter called "binary") as in the case of an embodiment based on the current invention, the image data are assumed as the selection pattern and the first moment can be obtained by selecting the row and the column decoders sequentially and computing the sum in a bit serial manner. The number of clocks necessary for obtaining the first moment is $\log_2 (N^2(N-1)/2) \approx (3n-1)$. In this computation, it is necessary to use the full adders as the first adders as shown in FIG. 9.

The first moment $m_{01}$ can be obtained in the same manner.

Further, the second moments $m_{20}$, $m_{02}$ can be expressed by equations (7) and (8) below.

$$m_{20} = \sum_{x=1}^{N} \sum_{y=1}^{N} x^2 I(x, y) \qquad (7)$$

$$m_{02} = \sum_{x=1}^{N} \sum_{y=1}^{N} y^2 I(x, y) \qquad (8)$$

When the image detection processing elements are provided with this multiplication function, $x^2I$ (x, y) and $y^2I$ (x, y) may be calculated within the respective image detection processing elements and the sum of these values may be calculated and hence, the number of clocks necessary for computing becomes $\log_2 (N^2(N-1)(N-1)(M-1)/6) \approx (4n+m-1)$. When the image detection processing elements are not provided with this multiplication function as in the case of this embodiment of the invention, with the use of the selection pattern expanded on the bit plan with respect to $x^2$ and $y^2$, the number of clocks necessary for computing becomes $2n \log_2 (N^2(M-1)) \approx 2n(2n+m)$. When the image data are binary, the number of clocks necessary for computing becomes $\log_2 N^2(N-1)(2N-1)/6 \approx (4n-1)$.

Another second moment $m_{11}$ is expressed by equation (9) below.

$$m_{11} = \sum_{x=1}^{N} \sum_{y=1}^{N} xyI(x, y) \qquad (9)$$

$$= \sum_{x=1}^{N} \sum_{y=1}^{N} \sum_{k=1}^{n} x_k 2^{k-1} \sum_{l=1}^{n} y_l 2^{l-1} I(x, y)$$

$$= \sum_{k=1}^{n} \sum_{l=1}^{n} 2^{k+l-2} \sum_{x=1}^{N} \sum_{y=1}^{N} x_k y_l I(x, y)$$

$$= \sum_{k=1}^{n} \sum_{l=1}^{n} 2^{k+l-2} s_{kl}$$

$$= \sum_{k=1}^{n} 2^{k-1} s_k$$

When the image detection processing elements are provided with the multiplication function, the number of clocks necessary for computation becomes $\log_2 (N^2(N-1)^2(M-1)/4) \approx (4n+m-2)$. Even when the image detection processing elements are not provided with this multiplication function as in the case of this embodiment, the value of Sk1 can be obtained with $\log (N^2(M-1)) \approx (2n+m)$ clocks. The value of $m_{11}$ can be calculated by repeating the calculation of $s_{k1}$ $n^2$ times and adding them while performing the bit shift using the external processing processor. In this case, the number of clocks necessary for computing becomes not more than $n^2(2n+m)$. When the image data are binary, the value of $s_k$ can be obtained with $\log_2 (N^2(M-1)/2) \approx (3n-1)$ clocks and by repeating this n times; the value of $m_{11}$ can be obtained with n(3n−1) clocks.

The relationship between the number of clocks and the running time necessary for the moment computing processing is described in Table 1 below.

TABLE 1

| Algorithm | clock cycle (running time) | |
|---|---|---|
| | (A) | (B) |
| 0-order moment $m_{00}$ | | |
| (N = 64, M = 64) | 18 (2.3 μs) | 18 (2.3 μs) |
| (N = 256, M = 64) | 22 (11 μs) | 22 (11 μs) |
| (N = 256, M = 2) | 16 (8.2 μs) | 16 (8.2 μs) |
| first moment $m_{10}$, $m_{01}$ | | |
| (N = 64, M = 64) | 25 (3.2 μs) | 102 (13 μs) |
| (N = 256, M = 64) | 29 (15 μs) | 168 (86 μs) |
| (N = 256, M = 2) | 23 (12 μs) | 23 (12 μs) |
| second moment $m_{20}$, $m_{02}$ | | |
| (N = 64, M = 64) | 29 (3.7 μs) | ≦216 (28 μs) |
| (N = 256, M = 64) | 37 (19 μs) | ≦352 (180 μs) |
| (N = 256, M = 2) | 31 (16 μs) | 31 (16 μs) |
| second moment $m_{11}$ | | |
| (N = 64, M = 64) | 28 (3.6 μs) | ≦648 (83 μs) |
| (N = 256, M = 64) | 36 (18 μs) | ≦1408 (720 μs) |
| (N = 256, M = 2) | 30 (15 μs) | 184 (94 μs) |

Here, data where the image detection processing elements are provided with the multiplication function is shown in column (A) of Table 1 and the data where the image detection processing elements are not provided with the multiplication function is shown in column (B) of Table 1.

Note that the running time does not include the running time of the external processor. Furthermore, since the shortest clock cycle is dependent on the delay time of the adders, assuming that the delay time of each adder is 1 ns, 2N ns (N being the number of matrix made of image detection processing elements) as a whole. According to this embodiment, the difference in running time between the image detection processor of this embodiment and the image detection process whose image detection processing elements have the multiplication function can be suppressed to the level of one digit.

In addition, according to the present invention, not only the moment, but also any arbitrary feature or quantity expressed by the following equation (10) can be computed rapidly.

$$\Sigma_{x=1}^{N}\Sigma_{y=1}^{N}f(x,y,I(x,y)) \quad (10)$$

According to the present invention, in the image detection processor, the processing data necessary for the image processing such as the calculation of the center of gravity or the like can be generated at the time of transferring data so that rapid processing can be realized.

Further, by arranging the image detection processing elements in a matrix and constituting first cumulative adders by connecting adders in respective rows in series, providing a second cumulative adder which cumulatively adds outputs of the final stages of the first cumulative adders of respective rows, and selectively inputting digital signals to the first cumulative adders, it becomes possible to output desired processed data such as partial sums for obtaining the 0-order moment of the image or the N-order (N being an integer of 1 or more) moment of the image rapidly.

Further, since the image take-in operation and the cumulative adding operation are performed using separate clocks, the processed data can be produced without being restricted by the speed of the image take-in operation.

Further, since the image detection processing element generates digital signals of the image detection processing element based on the digital signals from neighboring image detection processing elements and the output from the photodetector, it becomes possible to perform the simple processing such as the processing for separating the target from the background at the image detection processor side.

What is claimed is:

1. An image detection processor, comprising:
   an image detection processing array including a plurality of image detection processing elements arranged in at least one row; each said image detection processing element of said plurality of image detection processing elements comprising:
      a photodetector,
      a converter for converting signals from said photodetector into digital signals, and
      an adder which receives said digital signals as an input arranged on a plane;
   a cumulative adder formed by connecting said adders of a plurality of said image detection processing elements in sequence;
   a control circuit which selectively inputs said digital signals of a plurality of said image detection processing elements to said cumulative adder; and
   an output port to which processed data outputted from said cumulative adder is supplied in response to image data detected by said photodetector.

2. An image detection processor, comprising:
   an image detection processing array including a plurality of image detection processing elements arranged in a matrix having a plurality of rows; each said image detection processing element of said plurality of image detection processing elements comprising:
      a photodetector,
      a converter for converting signals from said photodetector into digital signals, and
      a first adder which receives said digital signals as an input arranged on a plane;
   first cumulative adders formed by connecting said first adders of plurality of said image detection processing elements in respective rows of said matrix in sequence;
   second adders corresponding to respective rows of said image detection processing elements and receiving outputs of final stages of said first cumulative adders of respective rows as inputs;
   a second cumulative adder formed by connecting said second adders and cumulatively adding the outputs of said final stages of said first cumulative adders;
   a control circuit which selectively inputs said digital signals of a plurality of said image detection processing elements to said cumulative adder; and
   an output port to which processed data outputted from said cumulative adder is supplied in response to image data detected by said photodetector.

3. An image detection processor according to claim 2, wherein said digital signals of said image detection processing elements are all inputted to said first adders by said control circuit and said processed data outputted from said second adder is set to the 0-order moment of focus images focused to a group of said image detection processing elements.

4. An image detection processor according to claim 2, wherein several digital signals selected from said digital signals of said image detection processing elements are inputted to said first adders by said control circuit and said processed data outputted from said second adder is set to a partial sum for obtaining an N-order moment of focused images focused to a group of said image detection processing elements, where N is an integer of at least one.

5. An image detection processor according to claim 2, wherein said converters are operated in accordance with first clocks signals so as to generate said digital signals and said first and second adders are operated in accordance with second clock signals different from said first clock signals, and said processed data is outputted from said second adders in order from the lower digit.

6. An image detection processor according to claim 1, wherein said digital signals outputted from a specific image detection processing element is generated based on an output from said photodetector of said specific image detection processing element and said digital signals from a plurality of image detection processing elements arranged close to said specific image detection processing element.

7. An image detection processor according to claim 1, wherein all elements are formed into one chip.

8. An image detection processor according to claim 2, wherein all elements are formed into one chip.

9. An image detection processor, comprising:
   an image detection processing element array which includes a plurality of an image detection processing elements arranged in a matrix form, each of the image detection processing elements including a photodetector, a converter for converting signals from said photodetector into digital signals, and an adder which receives said digital signal and output of a precedent image detection processing element, and outputs an added signal to a next image detection processing element;

a plurality of row lines, each of which is connected to the image detection processing element arranged in a first direction;

a plurality of column lines, each of which is connected to the image detection processing element arranged in a second direction;

a control circuit which selectively inputs digital signals of the image detection processing elements to a corresponding adder by controlling the row and column lines; and an output port to which processed data outputted from an arbitrary adder is supplied in response to image data detected by said photodetector.

10. An image detection processor comprising:

an image detection processing element array which includes a plurality of image detection processing elements arranged in a matrix form, each of the image detection processing elements including a photodetector, a converter for converting signals from said photodetector into digital signals, and a first adder which receives said digital signal and digital signals of a precedent image detection processing element, an outputs and added signal to a next image detection processing element;

a plurality of row lines, each of which is connected to the image detection processing element arranged in a first direction;

a plurality of column lines, each of which is connected to the image detection processing element arranged in a second direction;

a control circuit which selectively inputs digital signals of the image detection processing elements to a corresponding first adder by controlling the row and column lines;

second adders corresponding to respective rows of the image detection processing element, and receiving outputs of final stage of the first adders of respective rows and output of precedent second adder; and an output port to which processed data outputted from a final stage of a second adder is supplied in response to image data detected by said photodetector.

11. An image detection processor comprising:

an image detection processing element array which includes a plurality of image detection processing elements, each of the image detection processing elements including a photodetector, a converter for converting signals from said photodetector into digital signals, and an adder which receives said digital signal and output of a precedent image detection processing element, and outputs an added signal to a next image detection processing element;

a plurality of control lines which are connected to the image detection processing elements;

a control circuit which selectively inputs digital signals of the image detection processing elements to a corresponding adder by controlling the row and column lines; and an output port to which processed data outputted from an arbitrary adder is supplied in response to image data detected by said photodetector.

12. An image detection processor according to claim 11, wherein said digital signals outputted from a specific image detection processing element is generated based on an output from said photodetector of said specific image detection processing element and said digital signals from a plurality of image detection processing elements arranged close to said specific image detection processing element.

13. An image detection processor according to claim 11, wherein all elements are formed into one chip.

* * * * *